Aug. 5, 1924.

E. SCHNEEBELI

ROLLER MOUNTING

Filed June 13, 1922

1,503,920

Inventor:
Emil Schneebeli
By James T. Burke
his Attorney.

Patented Aug. 5, 1924.

1,503,920

UNITED STATES PATENT OFFICE.

EMIL SCHNEEBELI, OF LOS ANGELES, CALIFORNIA.

ROLLER MOUNTING.

Application filed June 13, 1922. Serial No. 568,057.

*To all whom it may concern:*

Be it known that I, EMIL SCHNEEBELI, a citizen of Switzerland, residing at Los Angeles, in the county of Los Angeles and State of California, have invented new and useful Improvements in Roller Mountings, of which the following is a detailed specification.

This invention has to do generally with a mounting for rollers such, for instance, as are used in paper and textile mills, printing presses, etc.

Rollers of the character above referred to are comparatively long and heavy and are usually mounted by means of trunnions extending from their ends and carried in stationary bearings. These mountings are rather inefficient and frequently give trouble, as it is more or less difficult to properly align the bearings and to maintain them in proper alignment.

It is an object of this invention to provide a roller mounting which is simple and effective and which allows the roller to be easily positioned and maintained in a machine.

Figure 1:
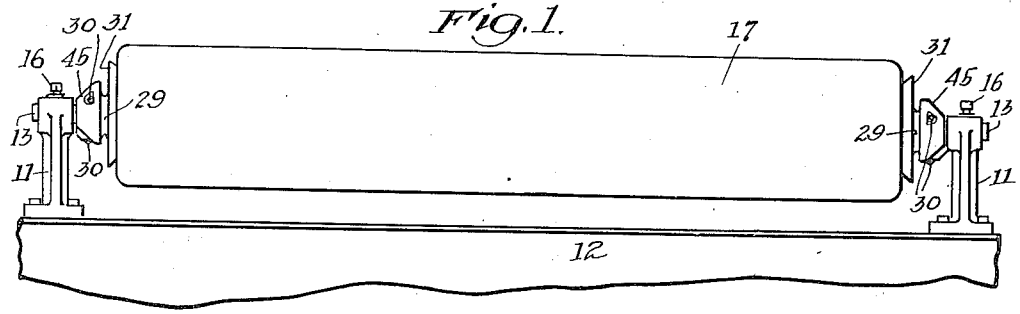
Figure 2:
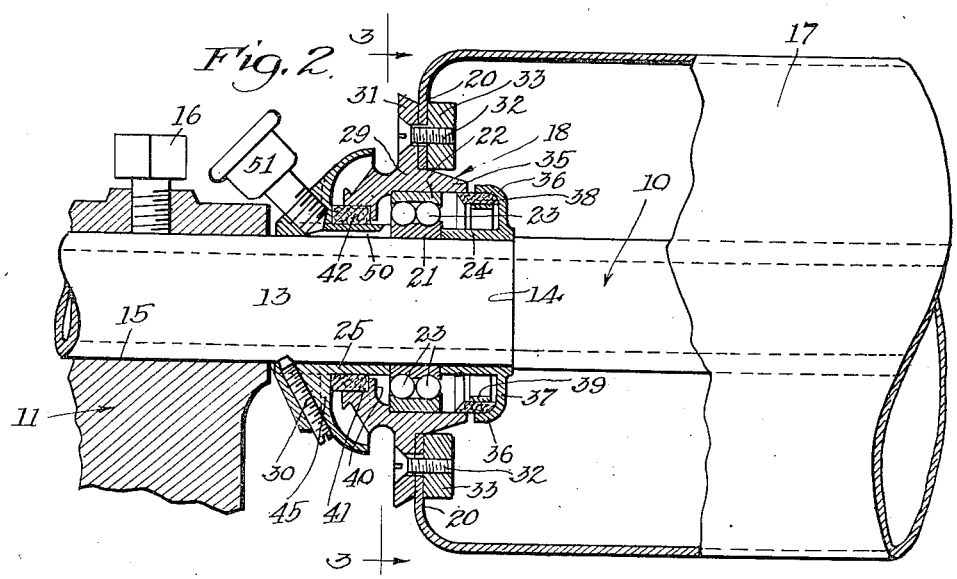
Figure 3:
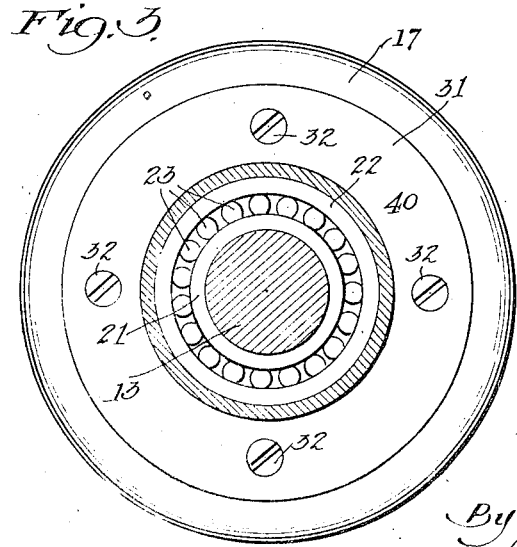

The various objects and features of the invention will be best and more fully understood from the following detailed description of a typical preferred embodiment of the invention, throughout which reference is had to the accompanying drawings, in which:

Fig. 1 is a view showing a roller mounted in accordance with the present invention; Fig. 2 is an enlarged detailed sectional view showing in detail the mounting provided by the present invention; and Fig. 3 is a transverse sectional view taken as indicated by line 3—3 on Fig. 2.

In the drawings numeral 10 designates, generally, a stationary arbor, the ends of which are supported by brackets 11 secured to a suitable base 12. The end portions 13 of the arbor 10 are somewhat smaller in diameter than the rest of the arbor forming outwardly facing shoulders 14 near the ends of the arbor. The brackets 11, which I have disclosed in the drawings, are of simple construction, being formed with openings 15 which slidably carry the outer ends of the end portions 13 of the arbor, and being provided with set screws 16 for holding the arbor firmly against movement. These screws may be omitted if desired without impairing the operation of the structure provided by my invention.

The roller 17, illustrated in the drawings, is a straight smooth roller and is rotatably mounted on the arbor 10 by means of bearings 18. However, the invention may be used in connection with various types of rollers, for instance, the rollers might be ribbed or fluted rather than plain. It is preferred that the roller 17 be in the form of a sheet metal tube or cylinder of the desired size and configuration and that it be provided at its ends with inwardly extending flanges 20. The bearings 18 are located at the ends of the roller 17, and as they are the same in construction and operation, I will proceed to describe only one of them in detail, it being understood, of course, that such description is applicable to both of them.

The bearing 18 comprises, generally, an inner ring 21, secured on the end portion 13 of the arbor 10, an outer ring 22 connected with the end of the roller 17, and a plurality of supporting members 23, say for instance ball bearings, rotatably supporting the outer ring on the inner ring. The inner ring 21 of the bearing is held between an inner collar 24 which engages the shoulder 14 and an outer collar 25 which clamps the inner ring 21 and inner collar 24 together and against the inner shoulder 14. Although various means may be provided for clamping the outer collar 25 toward the inner ring 21 and inner sleeve 24, it is preferred that there be a plurality of set screws 30 carried by the collar 25 in an inclined position so that they can be operated to engage the arbor 10 at an angle and wedge the collar 25 toward the ring 21 and inner collar 24. This particular means is extremely simple, compact, and effective. The outer ring 22 of the bearing 18 is held in a carrier 29 which is attached to the roller 17.

The carrier 29 has a flange 31 which extends outwardly from it and is attached to the flange 20 extending inwardly from the end of the roller. The flange 31 may be attached to the flange 20 by means of a plurality of screws 32 which extend inwardly through it and the flange 20 and screw thread into a ring 33 at the inner side of the flange 20. The carrier 29 has a part 35 which extends inwardly to but does not contact with the cylindrical portion 36 of a flange 37 which extends from the inner end of the inner collar 24. A ring of packing 38, preferably soft packing, is arranged within the parts 35 and 36 to seal the joint between them, and a spring ring 39 is arranged within the packing 38 to hold it in position and to feed it outwardly as it wears away.

A flange 40 extends outwardly from the carrier 29 and has a part which fits around the inner collar 25 with working clearance. A recess 41 is provided in the flange 40 at the collar 25 to carry packing 42 which operates to seal the joint between the collar and flange. The packing 42 is held between the collar 25 and flange 40, by a flange 45 which extends outwardly from the collar 25. The flange 45 overhangs the greater portion of the flange 40 so that it catches any oil or other liquid that is thrown from the flange 40 during operation of the roller. An oil groove 50 is provided in the collar 25 and extends from the outer part of the collar to the bearing 18 in order that oil or grease may be fed to the bearing from a grease cup 51, or the like. Oil or grease fed to the bearing through the groove 50 is prevented from escaping from the bearing by the packing 38 and 42.

With the construction hereinabove described the roller 17 may be properly mounted and adjusted on the arbor 10 prior to its being installed in the machine so that it can be properly and effectively mounted in the machine by simply supporting the ends of the arbor 10 in suitable brackets, or the like.

With the construction provided by the present invention there is little or no danger of the bearings getting out of line and there is no liability of the roller and roller mounting being injured if the brackets carrying the ends of the arbor do get out of line. Further, it is to be noted that the construction is particularly simple and compact and that it will operate in a particularly effective manner.

Having described only a preferred form of my invention, I do not wish to limit myself to the particular details hereinabove set forth but wish to reserve to myself any changes or variations that may appear to those skilled in the art and fall within the scope of the following claims.

Having described only a preferred form of my invention, I claim:

1. A mounting for a roller having an inwardly extending flange including a stationary arbor, a bearing comprising an inner ring, an outer ring and a plurality of members rotatably supporting the outer ring on the inner ring, two collars on the arbor holding the inner ring between them, a carrier holding the outer ring, and a flange extending from the carrier and attached to the flange of the roller.

2. A mounting for a roller having an inwardly extending flange, a stationary arbor, an outwardly facing shoulder on the arbor, an inner collar on the arbor engaging the shoulder, an outer collar on the arbor, a bearing comprising, an inner ring on the arbor between the collars, an outer ring, and a plurality of members rotatably supporting the outer ring on the inner ring, a plurality of set screws carried by the outer collar in an inclined position so that when they are tightened they engage the arbor and clamp the outer collar into pressure engagement with the inner ring, a carrier holding the outer ring, a flange extending from the carrier and attached to the flange of the roller, a part extending from the carrier to the outer collar, packing between the outer collar and said part, a flange extending from the outer collar and overhanging said part, a flange extending from the inner collar, a part extending from the carrier to said last mentioned flange, and packing between the last mentioned part and flange.

In witness that I claim the foregoing I have hereunto subscribed my name this 31st day of May, 1922.

EMIL SCHNEEBELI.